US006522351B1

(12) United States Patent
Park

(10) Patent No.: US 6,522,351 B1
(45) Date of Patent: *Feb. 18, 2003

(54) STEREOSCOPIC IMAGE DISPLAY APPARATUS USING A SINGLE PROJECTOR

(75) Inventor: Joon-Soo Park, Suwon (KR)

(73) Assignee: Samsung Electronics Co., Ltd., Kyungki-do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 894 days.

(21) Appl. No.: 08/753,883

(22) Filed: Dec. 2, 1996

(30) Foreign Application Priority Data

Dec. 29, 1995 (KR) ............................................. 95-65611

(51) Int. Cl.[7] ........................ H04N 13/04; H04N 15/00
(52) U.S. Cl. .......................................... 348/51; 348/54
(58) Field of Search ............................ 348/42, 47, 51, 348/54–56; 349/15; 352/57; 353/7; 355/22; 345/6

(56) References Cited

U.S. PATENT DOCUMENTS

| 4,523,226 A | * | 6/1985 | Lipton et al. | 348/42 |
| 4,562,463 A | * | 12/1985 | Lipton | 348/42 |
| 4,672,434 A | * | 6/1987 | Suzuki et al. | 348/42 |
| 4,736,246 A | * | 4/1988 | Nishikawa | 348/42 |
| 5,193,000 A | * | 3/1993 | Lipton et al. | 348/51 |
| 5,260,773 A | | 11/1993 | Dischert | 358/3 |
| 5,416,510 A | * | 5/1995 | Lipton et al. | 348/43 |

FOREIGN PATENT DOCUMENTS

JP 5-336550 12/1993 .......... H04N/13/04

* cited by examiner

*Primary Examiner*—Vu Le
(74) *Attorney, Agent, or Firm*—Sughrue Mion, PLLC

(57) ABSTRACT

A stereoscopic image display apparatus displays a stereoscopic image using only a single projector. The apparatus includes a photography section for sensing a left image and a right image of an object and converting the left and right images into respective first and second television signals. The first and second television signals are received by a receiving section which then provides the signals to a double-scanning section. The double-scanning section scans the left and right image signals received from the receiving section at a doubled horizontal scan frequency to produce a left double-scanned image signal and a right double-scanned image signal. A multiplexing section then alternately selects the left and right double-scanned image signals at a switching speed of the doubled horizontal frequency to thereby produce a single, multiplexed double-scanned image signal. A projection type display section projects the multiplexed double-scanned image signal onto a single display screen.

3 Claims, 5 Drawing Sheets

STEREOSCOPIC IMAGE DISPLAY APPARATUS USING A SINGLE PROJECTOR

BACKGROUND OF THE INVENTION

1. Field of the Invention

The present invention relates to a three-dimensional image display apparatus. In particular, the present invention relates to a stereoscopic image display apparatus of a projection type which can display a stereoscopic image using a single display device by double-scanning a pair of images photographed by a pair of video cameras, respectively, and synthesizing the double-scanned images by line interlacing to form the stereoscopic image.

2. Description of the Prior Art

Humans perceive a stereoscopic effect because different images are formed on the retina of each eye due to the distance between the eyes (about 2.5 inches). The difference between the images generated on each retina is caused by the horizontal distance of the image as projected on each retina. Parallax, on the other hand, is caused by the horizontal distance between two points of an image as projected on a two dimensional monitor. Parallax can be used to generate the appearance of the stereoscopic effect.

There has been long and steady research in developing a display which causes the viewer to perceive a stereoscopic image. One well known technique is the "both-eye" type stereoscopic image realization which is achieved by utilizing spectacles worn by the viewer.

Generally, red-blue color type spectacles, polarization spectacles, and electronic shutter type spectacles are commonly used for viewing the stereoscopic image. According to the red-blue color type technique, a red-colored image (R) filtered from a left-side image and a blue-colored image (B+G) filtered from a right-side image are synthesized with a positive or negative parallax, and the synthesized image signal is displayed. Using the color spectacles, the viewer can perceive a stereoscopic image by having the viewer's left eye observe only the red-colored image through a red color filter, while the viewer's right eye observe only the blue-colored image through a blue color filter. On the other hand, a stereoscopic image in motion can be generated by an analog type stereoscopic system in which the stereoscopic image is filmed using two cameras and is then displayed using two projectors.

According to a liquid crystal shutter type stereoscopic system, the screen is divided into odd lines and even lines. A left-side image is provided for the odd lines and a right-side image is provided for the even lines. The images are synthesized to create a stereoscopic image, and the synthesized stereoscopic image is displayed on a monitor. The viewer perceives the stereoscopic image by observing the left-side image only by the left eye, while the right shutter of the spectacles is shut, and observing the right-side image only by the right eye, while the left shutter is shut. The operation of the shutters is synchronized with the image displayed on the monitor.

According to a conventional stereoscopic image display apparatus for displaying a stereoscopic image on a display screen as shown in FIG. 1, a pair of image signals are generated by two video cameras 12 and 14 located at a predetermined distance from an object 10 at predetermined separation therebetween. The pair of image signals are then displayed on a single display screen 20 by two display devices 16 and 18, respectively, overlapping each other.

Such stereoscopic display apparatuses are disclosed in Japanese Patent Laid-open No. Pyung 5-336550 and U.S. Pat. No. 5,260,773. Japanese patent Laid-open No. Pyung 5-336550 discloses a stereoscopic display technique whereby two pairs of image signals are interlaced for each line in a vertical direction for each pair of the image signals to be synthesized, the synthesized pair of image signals are formed and then displayed on a single display screen by two projectors, respectively, U.S. Pat. No. 5,260,773 discloses another stereoscopic display technique whereby a pair of image signals are synthesized by field interlacing and the synthesized image signal is transmitted. Upon reception, the transmitted image signal is separated into a pair of image signals, and the pair of image signals are displayed by two display devices, respectively.

However, such conventional stereoscopic image display apparatuses have drawbacks in that they require two separate projectors in order that two images, i.e., the left and right images, be separately displayed on a single display screen, overlapping each other. This causes an increase in the size of the stereoscopic image display device and complicates its mechanical structure.

SUMMARY OF THE INVENTION

It is an object of the present invention to solve the problems involved in the prior art, and to provide a stereoscopic image display apparatus having simplified mechanical structure and reduced size by displaying a stereoscopic image using a single projector. The image can then be viewed using conventional spectacles such as the ones disclosed in, for example, U.S. Pat. No. 5,260,773.

In one aspect of the present invention, two separate cameras are used to picture an object and generate a first and a second television signals corresponding to the left and right images. A receiver receives the television signals and reproduces the left and right image signals, respectively. A double-scanning section scans the left and right image signals with a doubled horizontal frequency, and produces a left and a right double-scanned image signals. A multiplexing section alternately selects the left and right double-scanned image signals at a switching speed of the doubled horizontal frequency, and produces a single multiplexed double-scanned image signal. A projection type display projects the multiplexed double-scanned image signal onto a single display screen.

In another aspect of the present invention, the left and right image signals of the two cameras are scanned by the double-scanning section at a doubled horizontal frequency, to produce left and right double-scanned image signals. A multiplexing section alternately selects the left and right double-scanned image signals at a switching speed of the doubled horizontal frequency, and produces a single multiplexed double-scanned image signal. A transmitter is used for transmitting the multiplexed double-scanned image signal as a television signal. A receiver is used for receiving the television signal and providing a demodulated multiplexed double-scanned image signal. A projection type display projects the demodulated multiplexed double-scanned image signal onto a single display screen.

In still another aspect of the present invention, the left and right image signals are scanned by the double-scanning section to produce left and right double-scanned image signals. A multiplexing section alternately selects the left and right double-scanned image signals at a switching speed of the doubled horizontal frequency, and produces a single multiplexed double-scanned image signal. A projection type display projects the multiplexed double-scanned image signal onto a single display screen.

BRIEF DESCRIPTION OF THE DRAWINGS

The above objects and other features and advantages of the present invention will become more apparent by describing the preferred embodiments thereof with reference to the accompanying drawings, in which.

DETAILED DESCRIPTION OF PREFERRED EMBODIMENTS

Figure 1:
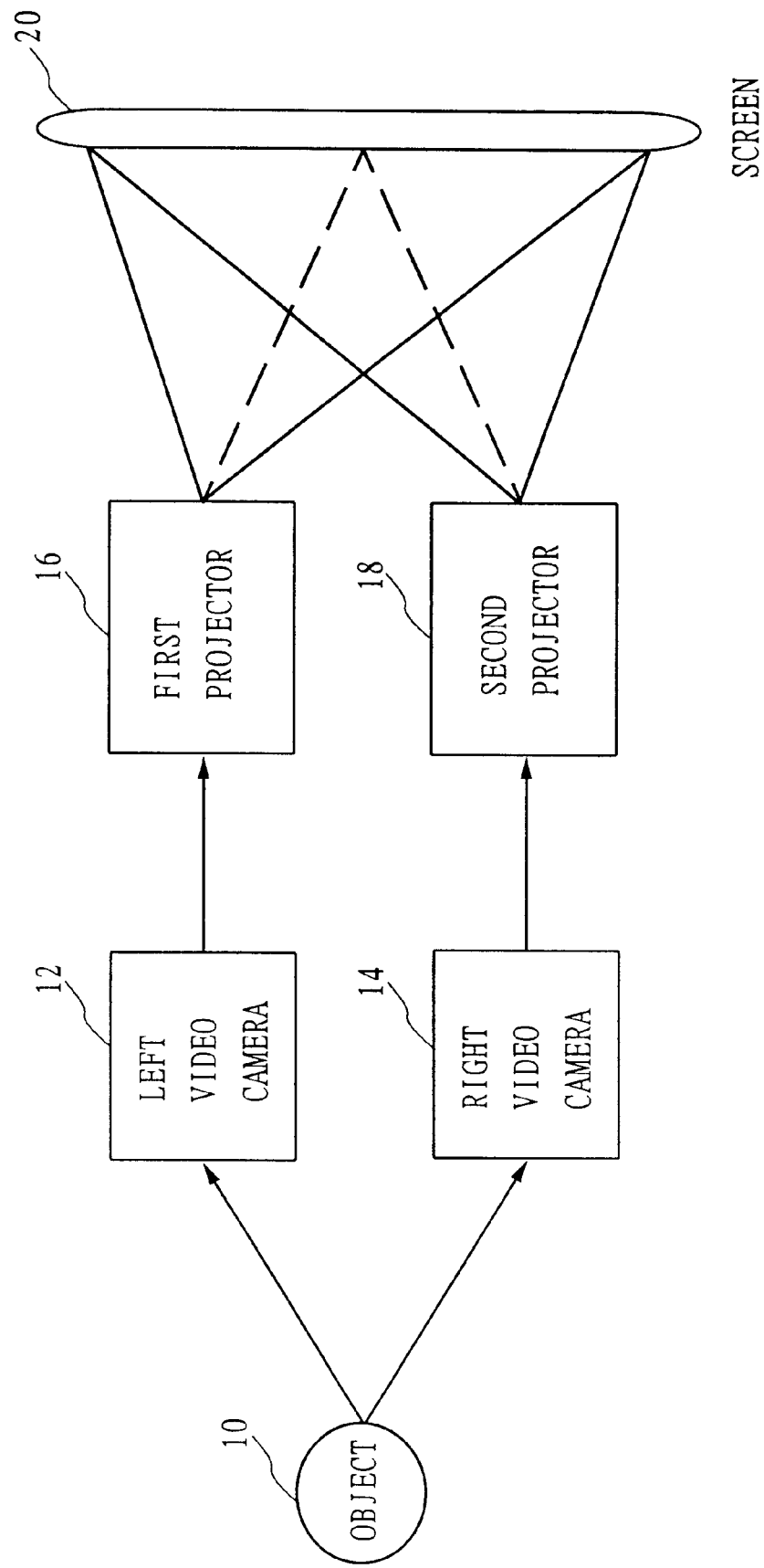
FIG. 1 is a block diagram of the construction of a conventional stereoscopic image display apparatus.
Figure 2:
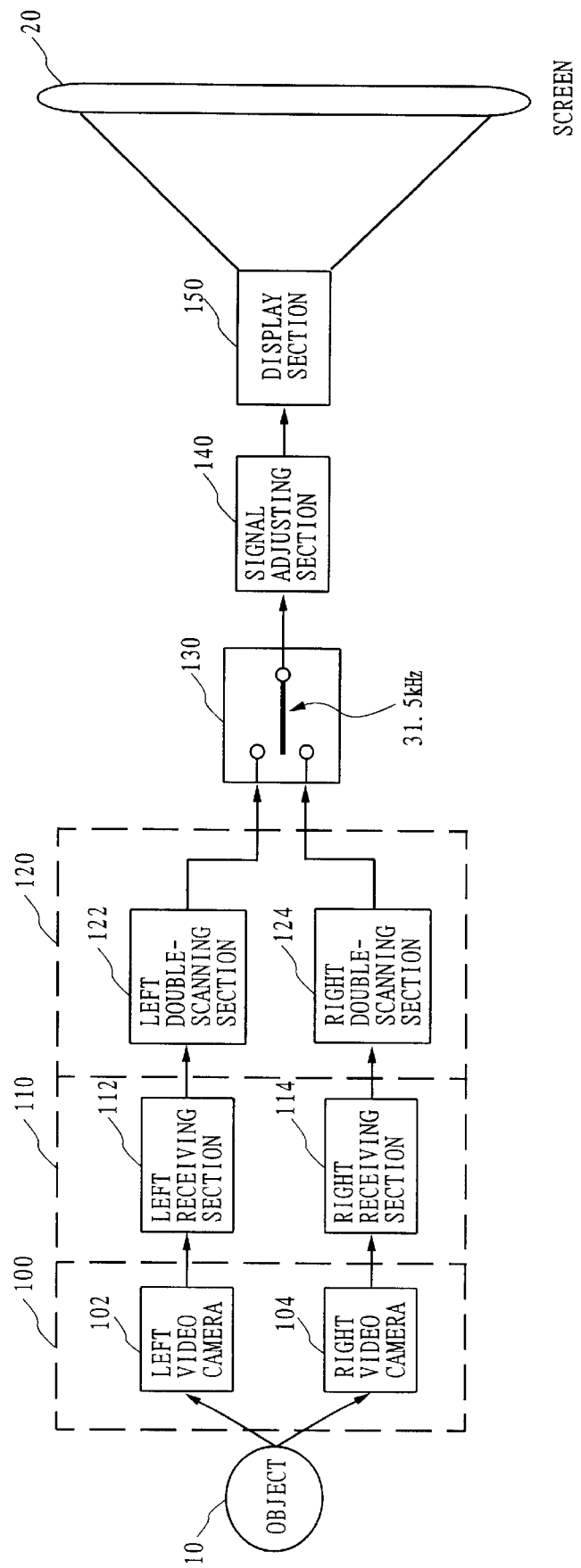
FIG. 2 is a block diagram of the stereoscopic image display apparatus according to an embodiment of the present invention.

FIG. 2 illustrates the stereoscopic image display apparatus according to one embodiment of the present invention. Referring to FIG. 2, the apparatus includes a photography section 100, composed of a pair of video cameras 102 and 104 arranged at predetermined separation therebetween. The left and right images of an object 10 as seen by the cameras 102 and 104 are converted into first and second television signals, respectively. A receiving section 110, composed of a pair of receiving circuits 112 and 114, receives the first and second television signals and reproduces the left and right image signals, respectively. A double-scanning section 120, composed of a pair of double-scanning circuits 122 and 124, repeatedly scans twice each line of the left and right image signals provided from the receiving section 110, and produces left and right double-scanned image signals having a horizontal frequency which is twice as high as the horizontal frequency (e.g., 15.7414 KHz) of the cameras' signals. A multiplexing section 130 alternately selects each line of the left and right double-scanned image signals at a switching speed (e.g., 31.5 KHz) of the doubled horizontal frequency and produces a line-interlaced synthesized image signal. A projection type display section 150 projects the synthesized image signal onto a display screen 20.

Figure 5:
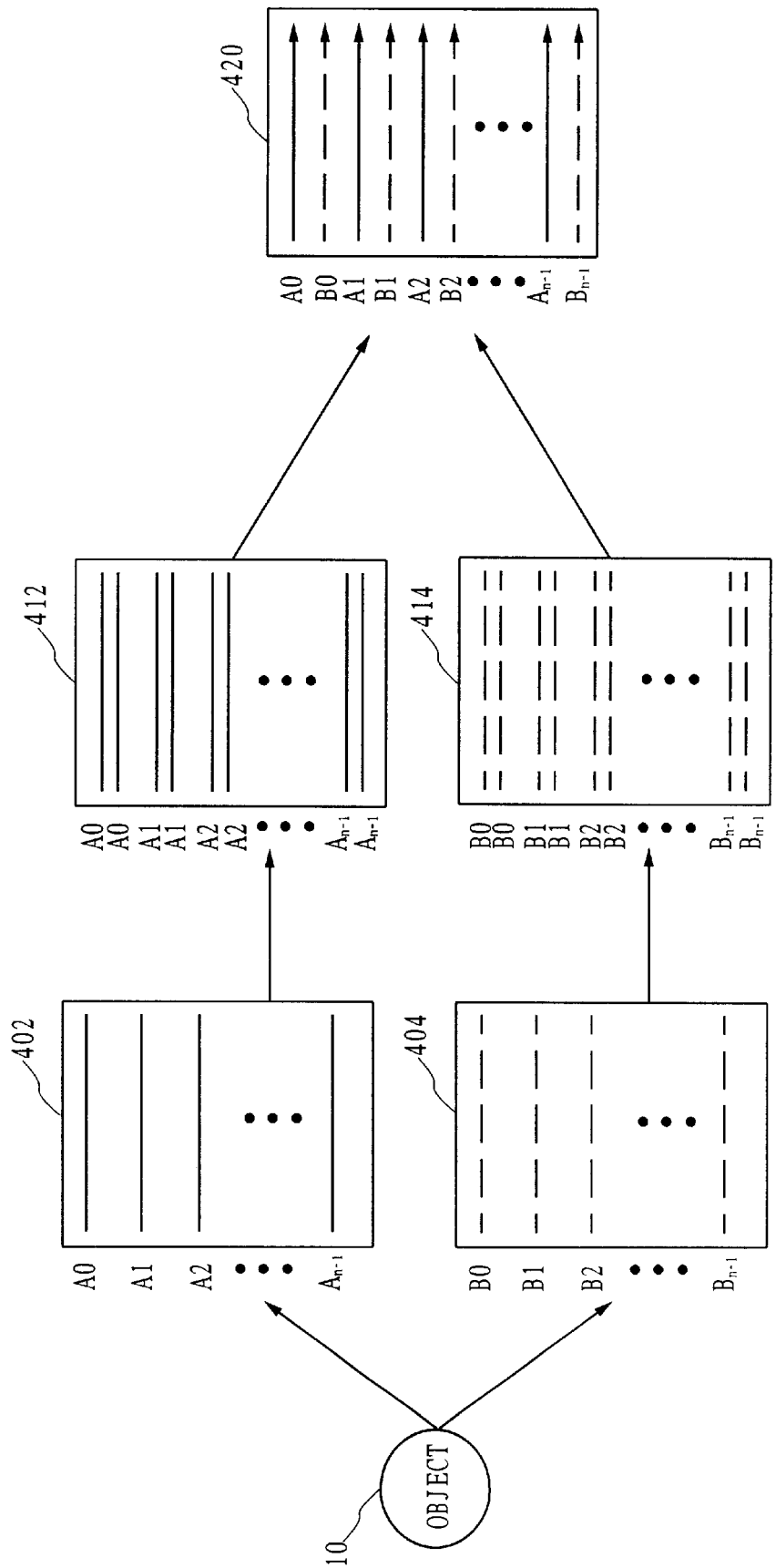
FIG. 5 is a view explaining the image synthesizing method by line interlacing according to the present invention.

Accordingly, referring to FIG. 5, the respective video cameras 102 and 104 produce and output as the television signals the left image signal 402 and the right image signal 404, each of which has n horizontal lines. The receiving circuits 112 and 114 demodulate the received television signals to reproduce the left and right image signals. The double-scanning circuits 122 and 124 scan each line of the left and right image signals 402 and 404 twice, and output the double-scanned image signals 412 and 414, having 2n horizontal lines.

The multiplexing section 130 alternately selects the double-scanned image signals 412 and 414 and produces the synthesized image signal 420, having n lines and a horizontal frequency of 31.5 KHz as shown in FIG. 5. The signal adjusting section 140 is composed of buffers and filters for adjusting the signal level and removing noise from the synthesized image signal 420. The display section 150, such as a cathode-ray tube (CRT), displays the synthesized image signal having the horizontal frequency of 31.5 KHz on the screen. That is, in this embodiment, the display apparatus receives the left and right image signals produced from the two video sources, and forms the synthesized stereoscopic image signal.

As described above, according to this embodiment, the stereoscopic image signal can be displayed on the screen using a single projector by double-scanning the left and right image signals, and synthesizing the double-scanned image signals by line interlacing to form the stereoscopic image signal. Accordingly, the construction of the stereoscopic image display apparatus is simplified and its size and weight are reduced in comparison to the conventional stereoscopic image display apparatus which requires two separate display devices.

Figure 3:
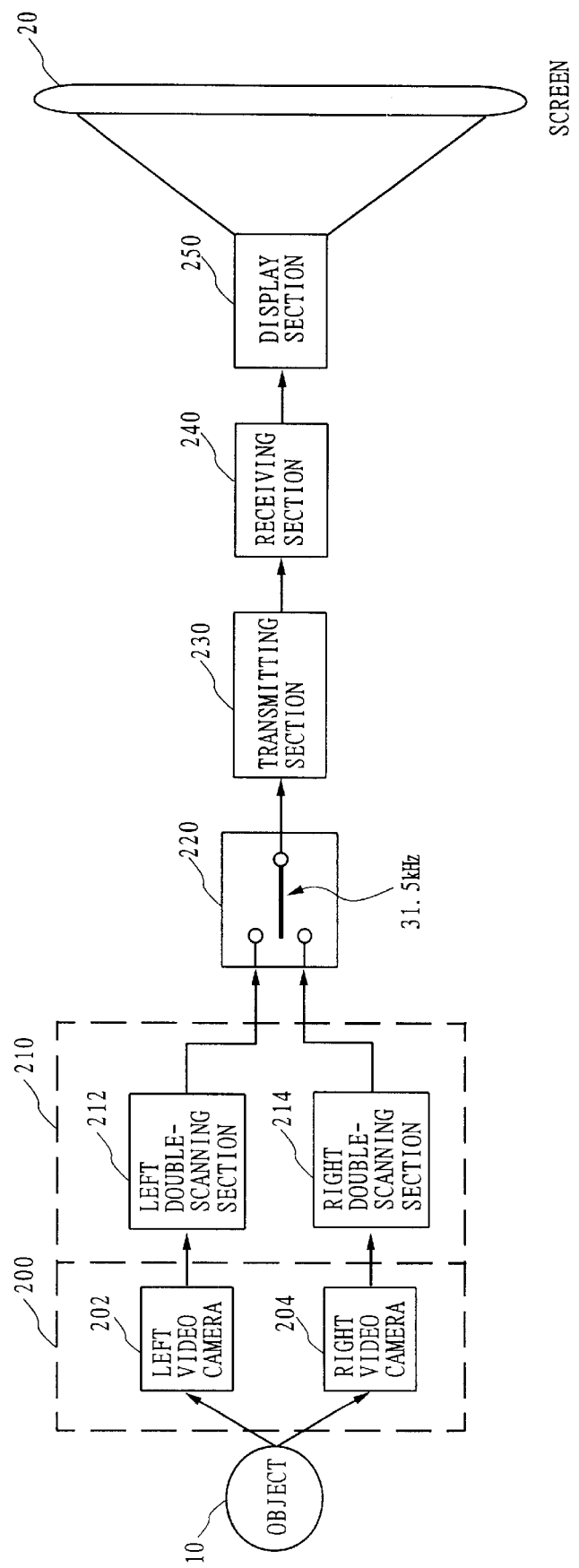
FIG. 3 is a block diagram of the stereoscopic image display apparatus according to another embodiment of the present invention.

FIG. 3 illustrates the stereoscopic image display apparatus according to another embodiment of the present invention. Referring to FIG. 3, the apparatus includes a photography section 200, composed of a pair of video cameras 202 and 204, for generating left and right images of an object 10 and converting the left and right images into left and right image signals. A double-scanning section 210, composed of a pair of double-scanning circuits 212 and 214, scans the left and right image signals provided from the pickup section 200 with a doubled horizontal frequency and produces left and right double-scanned image signals. A multiplexing section 220 alternately selects the left and right double-scanned image signals at a switching speed of the doubled horizontal frequency, and produces a single multiplexed double-scanned image signal. A transmission section 230 transmits the multiplexed double-scanned image signal as a television signal to a receiving section 240, which demodulates the multiplexed double-scanned image signal. A projection type display section 250 projects the demodulated multiplexed double-scanned image signal onto a single display screen 20. In this embodiment, the synthesized stereoscopic image signal is formed at the transmission section, and is then received and displayed at the receiving section.

Figure 4:
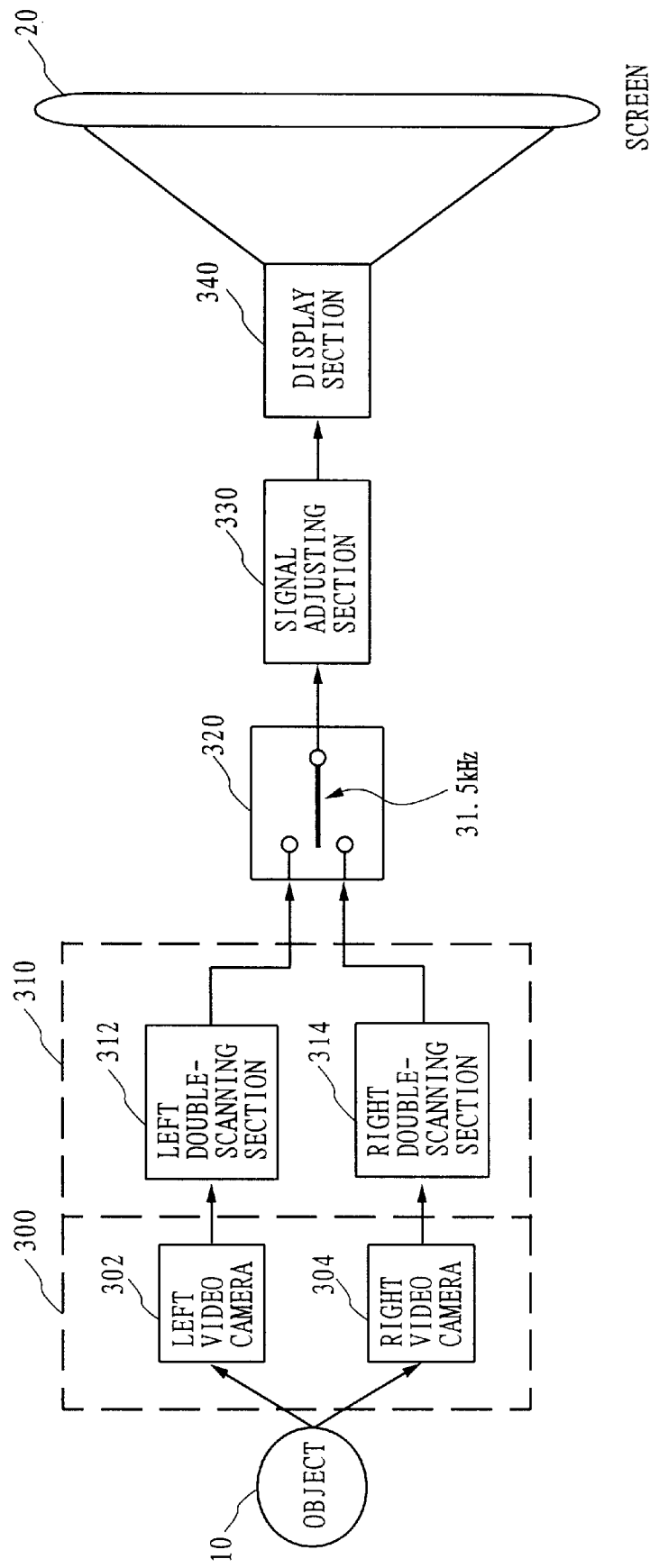
FIG. 4 is a block diagram of the stereoscopic image display apparatus according to still another embodiment of the present invention.

FIG. 4 illustrates the stereoscopic image display apparatus according to still another embodiment of the present invention. Referring to FIG. 4, the apparatus includes a photography section 300, composed of a pair of video cameras 302 and 304, for generating left and right images of an object 10 and converting the left and right images into left and right image signals. A double-scanning section 310, composed of a pair of double-scanning circuits 312 and 314, scans the left and right image signals provided from the pickup section 300 with a doubled horizontal frequency and produces left and right double-scanned image signals. A multiplexing section 320 alternately selects the left and right double-scanned image signals at a switching speed of the doubled horizontal frequency and produces a single multiplexed double-scanned image signal. A signal adjusting section 330 buffers and filters the synthesized multiplexed double-scanned image signal for level adjustment and noise removal. A projection type display section 340 projects the adjusted double-scanned image signal onto a single display screen 20.

From the foregoing, it will be apparent that the stereoscopic image display apparatus according to the present invention provides advantages in that its structure can be simplified with the reduction of its size by synthesizing left and right image signals by line interlacing to form a stereoscopic image signal, and by displaying the stereoscopic image signal using a single projector.

While the present invention has been described and illustrated herein with reference to the preferred embodiments thereof, it will be understood by those skilled in the art that various changes in form and details may be made therein without departing from the spirit and scope of the invention.

What is claimed is:

1. A stereoscopic image display apparatus comprising:

a receiver receiving first and second television signals and producing left and right image signals therefrom, respectively;

double-scanning means for repeatedly scanning twice each line of said left and right image signals, provided from said receiver, at a doubled horizontal frequency of said image signals to produce left and right double-scanned image signals;

multiplexing means for alternately selecting said left and right double-scanned image signals at a switching speed of said doubled horizontal frequency and producing a single multiplexed double-scanned image signal; and display means for projecting said multiplexed double-scanned image signal onto a single display screen.

2. A stereoscopic image display apparatus comprising:

double-scanning means for repeatedly scanning twice each line of left and right image signals, provided from first and second cameras, at a doubled horizontal frequency of said image signals to produce left and right double-scanned image signals;

multiplexing means for alternately selecting said left and right double-scanned image signals at a switching speed of said doubled horizontal frequency, and producing a single multiplexed double-scanned image signal;

transmitting means for transmitting said multiplexed double-scanned image signal as a television signal;

receiving means for receiving said television signal and providing a demodulated multiplexed double-scanned image signal; and a display means for projecting said demodulated multiplexed double-scanned image signal onto a single display screen.

3. A stereoscopic image display apparatus comprising:

double-scanning means for repeatedly scanning twice each line of an input left and right image signals at a doubled horizontal frequency of said image signals to produce left and right double-scanned image signals;

multiplexing means for alternately selecting said left and right double-scanned image signals at a switching speed of said double horizontal frequency and producing a single multiplexed doubled-scanned image signal; and display means for projecting said multiplexed double-scanned image signal onto a single display screen.

* * * * *